(12) United States Patent
Yu et al.

(10) Patent No.: US 9,912,252 B2
(45) Date of Patent: Mar. 6, 2018

(54) PRE-CHARGE CIRCUIT AND PHOTOVOLTAIC INVERTER

(71) Applicant: Sungrow Power Supply Co., Ltd., Hefei, Anhui (CN)

(72) Inventors: Yanfei Yu, Anhui (CN); Hua Ni, Anhui (CN); Zongjun Yang, Anhui (CN); Shangfang Dai, Anhui (CN); Pengcheng Huang, Anhui (CN)

(73) Assignee: SUNGROW POWER SUPPLY CO., LTD., Hefei (CN)

( * ) Notice: Subject to any disclaimer, the term of this patent is extended or adjusted under 35 U.S.C. 154(b) by 0 days.

(21) Appl. No.: 15/164,069

(22) Filed: May 25, 2016

(65) Prior Publication Data
US 2016/0352252 A1  Dec. 1, 2016

(30) Foreign Application Priority Data

May 27, 2015  (CN) .......................... 2015 1 0280409

(51) Int. Cl.
*H02M 7/537* (2006.01)
*H02M 1/36* (2007.01)
(Continued)

(52) U.S. Cl.
CPC ............ *H02M 7/537* (2013.01); *H02J 3/383* (2013.01); *H02M 1/36* (2013.01); *H02M 7/125* (2013.01);
(Continued)

(58) Field of Classification Search
CPC .................................................. H02M 7/537
(Continued)

(56) References Cited

U.S. PATENT DOCUMENTS 7,151,346 B2 * 12/2006 Sanchez ............... H05B 41/245
315/224
8,467,200 B2 *  6/2013 Pan ....................... H02M 3/337
363/21.02
(Continued)

FOREIGN PATENT DOCUMENTS

CN  102916437 A  2/2013
CN  104300777 A  1/2015
(Continued)

OTHER PUBLICATIONS

EP Patent Application No. 16171181.7 Extended EP Search Report dated Nov. 16, 2016 (10 pages).
(Continued)

*Primary Examiner* — Adolf Berhane
*Assistant Examiner* — Nusrat Quddus
(74) *Attorney, Agent, or Firm* — Conley Rose, P.C.

(57) ABSTRACT

Provided is a pre-charge circuit and a photovoltaic inverter. The pre-charge circuit includes an alternating current power source, a half-bridge rectifier, an auxiliary charging capacitor, a current limiting device and a controllable switch. The pre-charge circuit is connected to a target charging capacitor to form a voltage doubling rectifier circuit. A direct current side of the half-bridge rectifier is connected in parallel to the target charging capacitor, and an alternating current side of the half-bridge rectifier is connected to one end of the alternating current power source. One end of the auxiliary charging capacitor is connected to any one end of the target charging capacitor, and the other end of the auxiliary charging capacitor is connected to the other end of the alternating current power source.

18 Claims, 5 Drawing Sheets

(51) Int. Cl.
*H02J 3/38* (2006.01)
*H02M 7/12* (2006.01)
*H02M 7/219* (2006.01)
*H02M 7/5387* (2007.01)
*H02M 7/797* (2006.01)

(52) U.S. Cl.
CPC .......... *H02M 7/219* (2013.01); *H02M 7/5387* (2013.01); *H02M 7/797* (2013.01); *Y02E 10/56* (2013.01)

(58) Field of Classification Search
USPC .................................................. 363/131, 132
See application file for complete search history.

(56) References Cited

U.S. PATENT DOCUMENTS

| | | | | |
|---|---|---|---|---|
| 8,619,396 | B2* | 12/2013 | West | H01H 9/30 361/3 |
| 9,093,919 | B2* | 7/2015 | Chapman | H02J 3/38 |
| 9,490,704 | B2* | 11/2016 | Jang | H02M 3/285 |
| 2014/0293665 | A1 | 10/2014 | Hart et al. | |
| 2015/0177287 | A1* | 6/2015 | Baburaj | G01R 15/22 361/88 |

FOREIGN PATENT DOCUMENTS

| | | |
|---|---|---|
| DE | 20 2015 100283 U1 | 3/2015 |
| JP | H11-252923 A | 9/1999 |
| JP | 2004208408 A | 7/2004 |
| JP | 2005057949 A | 3/2005 |
| JP | 2008136316 A | 6/2008 |
| JP | 2012222854 A | 11/2012 |
| JP | 2013031309 A | 2/2013 |
| JP | 2013162591 A | 8/2013 |
| JP | 2014107931 A | 6/2014 |
| WO | 2008/066000 A1 | 6/2008 |

OTHER PUBLICATIONS

CN Patent Application No. 201510280409.8 Extended EP Search Report Office Action dated Feb. 6, 2017 (6 pages).
Japanese Office Action; Application No. 2016-103805; Sep. 12, 2017; 5 pages.

* cited by examiner

PRE-CHARGE CIRCUIT AND PHOTOVOLTAIC INVERTER

CROSS REFERENCE TO RELATED APPLICATION

The present application claims priority to Chinese Patent Application No. 201510280409.8, entitled "PRE-CHARGE CIRCUIT AND PHOTOVOLTAIC INVERTER", filed on May 27, 2015 with the State Intellectual Property Office of the People's Republic of China, which is incorporated herein by reference in its entirety.

BACKGROUND

Technical Field

The present disclosure relates to the technical field of photovoltaic power generation, and in particular to a pre-charge circuit and a photovoltaic inverter.

Background of the Technology

A photovoltaic inverter, which is an energy conversion device in a photovoltaic power generation system, serves to convert a direct current output from a photovoltaic battery into an alternating current and then transfer the alternating current to an electrical grid.

In the conventional technology, in order to turn on the photovoltaic inverter by a high voltage of the photovoltaic battery, the photovoltaic inverter is electrically connected to a pre-charge circuit as shown in FIG. 1 to raise a pre-charge voltage of a direct current bus, thereby avoiding a current impact caused by a significant voltage difference between the voltage of the battery and the voltage of the direct current bus at an instant when the photovoltaic inverter is electrically connected to the photovoltaic battery. In addition, in a case that the photovoltaic inverter operates in a static var generator mode, the direct current bus still needs to be pre-charged, to avoid a current impact caused by a significant voltage difference between a voltage of the direct current bus and a peak voltage of the electrical grid at an instant when a grid-connection is performed.

In the above pre-charge solution, a full bridge rectification with a diode uncontrolled rectifier bridge is adopted. A rectified voltage will not exceed a peak voltage of the electrical grid. In addition, due to a voltage drop caused by the rectifier component and current-limiting component and a load on a direct current side of the photovoltaic inverter, the actual rectified voltage may be lower, resulting in that the pre-charge voltage of the direct current bus cannot reach the voltage of the electrical grid or the voltage of the photovoltaic battery, and therefore it is impossible to avoid the current impact generated when the photovoltaic inverter is electrically connected to the photovoltaic battery or when a grid-connection is performed.

SUMMARY

In view of the above, the present disclosure provides a pre-charge circuit and a photovoltaic inverter, to address an issue of a low pre-charge voltage of a direct current bus, thereby avoiding a current impact generated when the photovoltaic inverter is electrically connected to a photovoltaic battery or when a grid-connection is performed.

A pre-charge circuit is provided, which includes an alternating current power source, a half-bridge rectifier, an auxiliary charging capacitor, a current limiting device and a controllable switch, and is connected to a target charging capacitor to form a voltage doubling rectifier circuit; where a direct current side of the half-bridge rectifier is connected in parallel to the target charging capacitor, and an alternating current side of the half-bridge rectifier is connected to one end of the alternating current power source;

one end of the auxiliary charging capacitor is connected to any one end of the target charging capacitor, and the other end of the auxiliary charging capacitor is connected to the other end of the alternating current power source;

the current limiting device is connected in series on each charging path of the pre-charge circuit; and the controllable switch is connected in series on each charging path of the pre-charge circuit.

In the pre-charge circuit, the alternating current power source may be a phase voltage of an electrical grid or a line voltage of an electrical grid.

In the pre-charge circuit, a semiconductor device in the half-bridge rectifier may be a diode, a thyristor, a Metallic Oxide Semiconductor Field Effect Transistor (MOSFET) or an Insulated Gate Bipolar Transistor (IGBT) with anti-parallel diode.

In the pre-charge circuit, the current limiting device may be a resistor, an electrical-inductor, a choke coil, or any combination thereof.

In the pre-charge circuit, the controllable switch may be a relay, a Metallic Oxide Semiconductor Field Effect Transistor (MOSFET) or an Insulated Gate Bipolar Transistor (IGBT).

In the pre-charge circuit, a semiconductor device in the half-bridge rectifier may be an anti-parallel diode in an inverting circuit of a photovoltaic inverter.

In the pre-charge circuit, the auxiliary charging capacitor may be a positive bus capacitor and/or a negative bus capacitor on a direct current side of the photovoltaic inverter.

In the pre-charge circuit, the current limiting device may be an alternating current reactor of the photovoltaic inverter.

In the pre-charge circuit, the controllable switch may be a grid-connected switch of the photovoltaic inverter.

A photovoltaic inverter is provided, which includes any one of the pre-charge circuits described in above.

It can be seen from the above technical solutions that, in the present disclosure, with the voltage doubling rectifier circuit including the alternating current power source, the half-bridge rectifier, the auxiliary charging capacitor, the current limiting device, the controllable switch and the target charging capacitor, the target charging capacitor is pre-charged to raise a voltage across the target charging capacitor (i.e. a pre-charge voltage of a direct current bus) maximally to two times of a peak voltage of the alternating current power source. Therefore, the issue of the low pre-charge voltage of the direct current bus is addressed, thereby avoiding the current impact generated when the photovoltaic inverter is electrically connected to the photovoltaic battery or when the grid-connection is performed.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description illustrate only some embodiments of the present disclosure. For those skilled in the art, other drawings may be obtained according to these drawings without any creative work.

DETAILED DESCRIPTION OF EMBODIMENTS

Figure 1:
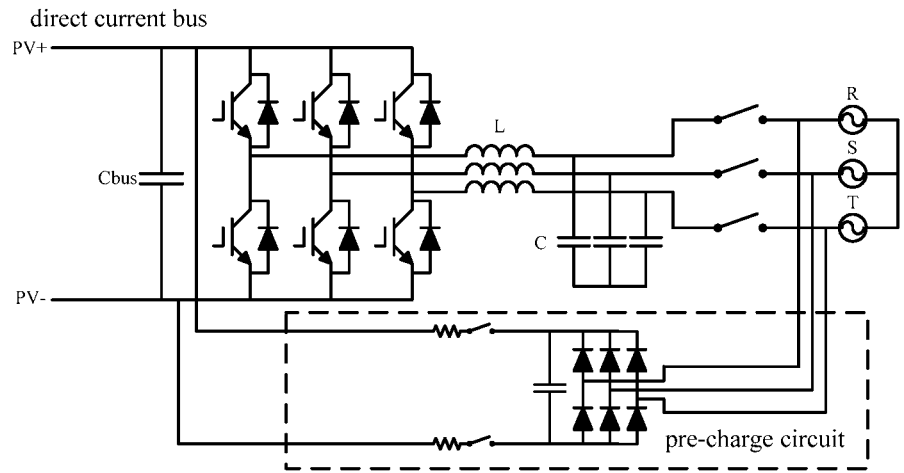
FIG. 1 is a schematic structural diagram of a pre-charge circuit applied in a photovoltaic inverter according to the conventional technology.

The technical solution according to the embodiments of the present disclosure will be described clearly and completely as follows in conjunction with the drawings. It is apparent that the described embodiments are only a few rather than all of the embodiments according to the present disclosure. Any other embodiments obtained by those skilled in the art based on the embodiments in the present disclosure without any creative work fall in the scope of the present disclosure.

A pre-charge circuit is provided according to an embodiment of the present disclosure, to address an issue of a low pre-charge voltage of a direct current bus, thereby avoiding a current impact generated when a photovoltaic inverter is electrically connected to a photovoltaic battery or when a grid-connection is performed. The pre-charge circuit includes an alternating current power source, a half-bridge rectifier, an auxiliary charging capacitor, a current limiting device and a controllable switch, and the pre-charge circuit is connected to a target charging capacitor to form a voltage doubling rectifier circuit.

A direct current side of the half-bridge rectifier is connected in parallel to the target charging capacitor, and an alternating current side of the half-bridge rectifier is connected to one end of the alternating current power source.

One end of the auxiliary charging capacitor is connected to any one end of the target charging capacitor, and the other end of the auxiliary charging capacitor is connected to the other end of the alternating current power source.

The current limiting device is connected in series on each charging path of the pre-charge circuit.

The controllable switch is connected in series on each charging path of the pre-charge circuit.

In the embodiment, with a voltage doubling rectifier circuit including the alternating current power source, the half-bridge rectifier, the auxiliary charging capacitor, the current limiting device, the controllable switch and the target charging capacitor, the target charging capacitor is pre-charged to raise a voltage across the target charging capacitor (i.e. a pre-charge voltage of a direct current bus) maximally to two times of a peak voltage of the alternating current power source. Therefore, the issue of the low pre-charge voltage of the direct current bus is addressed, thereby avoiding the current impact generated when the photovoltaic inverter is electrically connected to the photovoltaic battery or when the grid-connection is performed.

Components of the pre-charge circuit are described in the following five aspects.

I. Regarding the Alternating Current Power Source

The alternating current power source may be a phase voltage or a line voltage of an electrical grid. In a case that the alternating current power source is the phase voltage of the electrical grid, the pre-charge voltage of the direct current bus may be maximally raised to two times of a peak phase voltage of the electrical grid. In a case that the alternating current power source is the line voltage of the electrical grid, the pre-charge voltage of the direct current bus may be maximally raised to two times of a peak line voltage of the electrical grid.

II. Regarding the Half-Bridge Rectifier

A semiconductor device in the half-bridge rectifier is capable of limiting a current to flow in a single direction. For example, the semiconductor device may be a diode, a thyristor, a Metallic Oxide Semiconductor Field Effect Transistor (MOSFET) or an Insulated Gate Bipolar Transistor (IGBT) with anti-parallel diode.

Preferably, the semiconductor device in the half-bridge rectifier may be embodied directly as an anti-parallel diode of an inverting circuit of the photovoltaic inverter, to save the hardware cost.

III. Regarding the Auxiliary Charging Capacitor

The auxiliary charging capacitor may be embodied directly as a positive bus capacitor and/or a negative bus capacitor on a direct current side of the photovoltaic inverter, to save the hardware cost.

IV. Regarding the Current Limiting Device

The current limiting device may be a current limiting resistor, an inductor, a choke coil or any combination thereof. At least one current limiting device is connected in series on each charging path of the pre-charge circuit. Preferably, the current limiting device may be embodied directly as an alternating current reactor of the photovoltaic inverter, to save the hardware cost.

V. Regarding the Controllable Switch

The controllable switch may be a relay, a MOSFET, an IGBT or the like. At least one controllable switch is connected in series on each charging path of the pre-charge circuit. Preferably, the current limiting device may be embodied directly as a grid-connected switch of the photovoltaic inverter, to save the hardware cost.

In addition, the pre-charge circuit may have different structures including different numbers of the alternating current power sources, the half-bridge rectifiers and the auxiliary charging capacitors, which is described below with examples 1 to 3.

I. Example 1

Figure 2A:
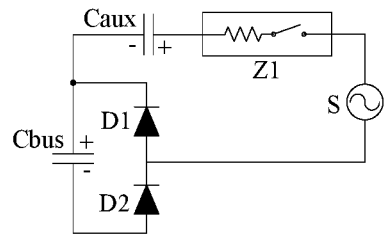
FIG. 2a is a schematic structural diagram of a pre-charge circuit according to an embodiment of the present disclosure.
Figure 2B:
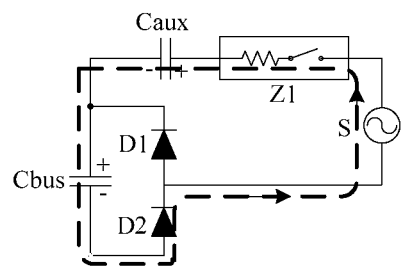
FIG. 2b is a schematic diagram of a charging path in a case that an alternating current power source in the circuit shown in FIG. 2a supplies a forward voltage.
Figure 2C:
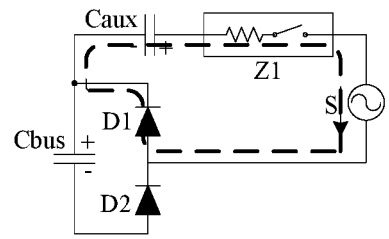
FIG. 2c is a schematic diagram of a charging path in a case that the alternating current power source in the circuit shown in FIG. 2a supplies a backward voltage.

Referring to FIG. 2a, a pre-charge circuit including one alternating current power source S, one half-bridge rectifier formed by a diode D1 and a diode D2 connected in series and one auxiliary charging capacitor Caux is taken as an example. In FIG. 2a, Z1 represents a switch current limiting device connected in series on a sole charging path of the pre-charge circuit, and Cbus represents a target charging capacitor. A voltage across the target charging capacitor is a pre-charge voltage of a direct current bus in a case that the charging is in a steady state. In a case that the alternating current power source S supplies a forward voltage, a charging path is as shown in FIG. 2b, i.e., a current flows through Z1, Caux, Cbus and D2, thereby forming a charging loop to forwardly charge Cbus and Caux. In a case that the alternating current power source S supplies a backward voltage, a charging path is as shown in FIG. 2c, i.e. a current flows through D1, Caux and Z1, thereby forming a charging loop to backwardly charge Caux. Since the forward charging loop includes resistance of Caux and Cbus, while the backward charging loop does not include resistance of Cbus, a forward charging current is lower than a backward charging current in the above charging process. Thus, Caux may accumulate backward charging electric charges, while Cbus accumulates forward charging electric charges only in a forward charging process.

It is assumed that a voltage amplitude of the alternating current power source S is denoted as Vs, a steady-state voltage of Cbus is denoted as Vbus and a steady-state voltage of Caux is denoted as Vaux. After the charging enters a steady state, the forward charging current as shown in FIG. 2b and the backward charging current as shown in FIG. 2c each approach zero, that is, a voltage drop of the switch current limiting device Z1 approaches zero. If voltage drops of the diodes D1 and D2 are omitted, a relation of voltages in the charging loop shown in FIG. 2b is expressed as $Vs = Vbus + Vaux.$ A relation of voltages in the charging loop shown in FIG. 2c is expressed as $Vaux = -Vs.$ And based on the above two expressions, a charged steady-state voltage of Cbus may be calculated as $Vbus = 2Vs.$ It can be seen that, the pre-charge voltage of Cbus may reach two times of the voltage amplitude of the alternating current power source of the pre-charge circuit. In a case that the alternating current power source S is a phase voltage having an effective value denoted as V and an amplitude value denoted as $Vs=\sqrt{2}V$, the charged steady-state voltage of Cbus is $Vbus=2\sqrt{2}V$ after the charging enters in a steady state. In a case that the alternating current power source S is a line voltage having an effective value denoted as V and an amplitude value denoted as $Vs=\sqrt{3}*\sqrt{2}V=\sqrt{6}V$, the charged steady-state voltage of Cbus is $Vbus=2\sqrt{6}V$ after the charging enters in a steady state.

Figure 3A:
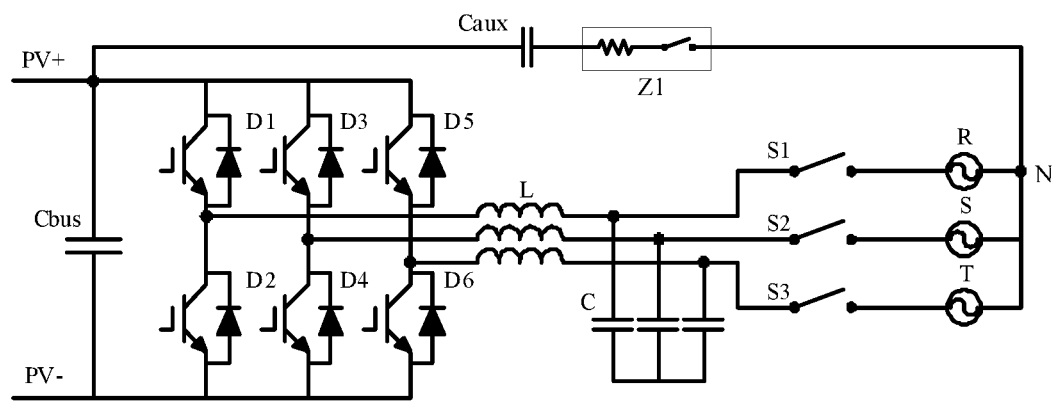
FIG. 3a is a schematic structural diagram of a three-phase two-level photovoltaic inverter in which the circuit shown in FIG. 2a is applied.

A pre-charge function may be achieved by applying the circuit shown in FIG. 2a in a three-phase two-level photovoltaic inverter shown in FIG. 3a, in which the auxiliary charging capacitor Caux and the switch current limiting device Z1 are connected in series between a neutral point N and a direct current side PV+ (or PV−) of an electrical grid, the alternating current power source is embodied directly as all or some of existing three phase voltages R, S and T, and the half-bridge rectifier is embodied directly as all or some of existing diodes D1 to D6 of an inverting circuit. Specifically, a complete pre-charge circuit may be formed by the phase voltage R, the diodes D1 and D2, a grid-connected switch S1, the auxiliary charging capacitor Caux and the switch current limiting device Z1. Another complete pre-charge circuit may be formed by the phase voltage S, the diodes D3 and D4, a grid-connected switch S2, Caux and Z1. Another complete pre-charge circuit may be formed by the phase voltage T, the diodes D5 and D6, the grid-connected switch S3, Caux and Z1. In addition, Z1 may be omitted since its function may be achieved by an alternating current reactor and the grid-connected switch of the photovoltaic inverter.

Figure 3B:
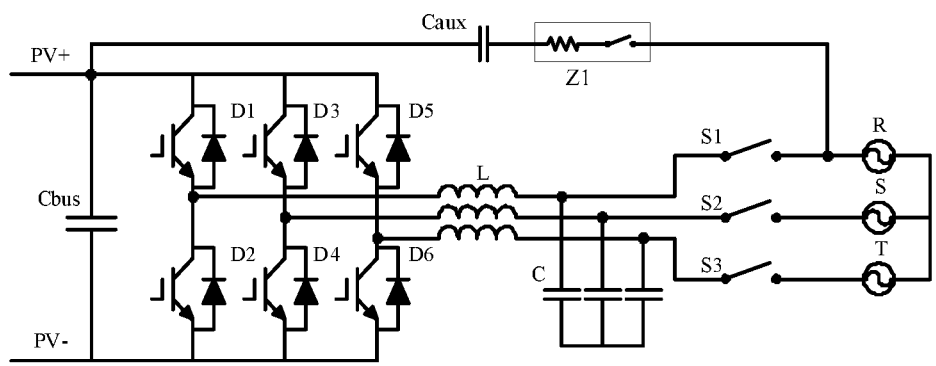
FIG. 3b is a schematic structural diagram of a three-phase two-level photovoltaic inverter in which the circuit shown in FIG. 2a is applied.

Further, the pre-charge function may be achieved by applying the circuit shown in FIG. 2a in a three-phase two level photovoltaic inverter shown in FIG. 3b, in which the alternating current power source is embodied directly as an existing R-S line voltage or an existing R-T line voltage, the half-bridge rectifier is embodied directly as all or some of existing diodes D1 to D6 of an inverting circuit, and the auxiliary charging capacitor Caux and the switch current limiting device Z1 are connected in series between the R-S line voltage or R-T line voltage and a direct current side PV+ (or PV−). Specifically, a complete pre-charge circuit may be formed by the R-S line voltage, a grid-connected switch S2, the diodes D3 and D4, Caux and Z1. Another complete pre-charge circuit may be formed by the R-T line voltage, the grid-connected switch S3, the diodes D5 and D6, Caux and Z1. In addition, Z1 may be omitted, since its function may be achieved by an alternating current reactor and a grid-connected switch of the photovoltaic inverter.

II. Example 2

Figure 4A:
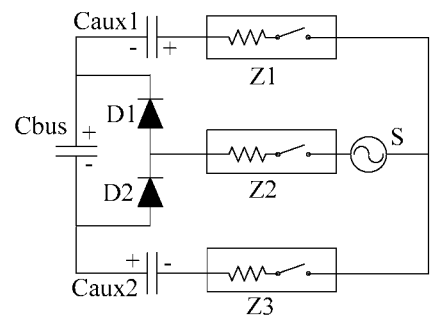
FIG. 4a is a schematic structural diagram of a pre-charge circuit according to an embodiment of the present disclosure.

Referring to FIG. 4a, a pre-charge circuit including one alternating current power source S, one half-bridge rectifier formed by diodes D1 and D2 connected in series and two auxiliary charging capacitors Caux1 and Caux2 is taken as an example. A switch current limiting device Z1 is connected in series on a charging path where Caux 1 is located. A switch current limiting device Z3 is connected in series on a charging path where Caux2 is located. A switch current limiting device Z2 is connected in series on a charging path shared by Caux1 and Caux2.

Figure 4B:
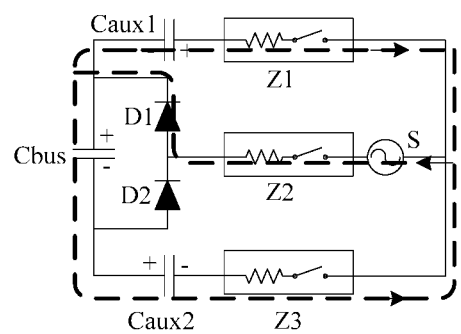
FIG. 4b is a schematic diagram of a charging path in a case that an alternating current power source in the circuit shown in FIG. 4a supplies a forward voltage.
Figure 4C:
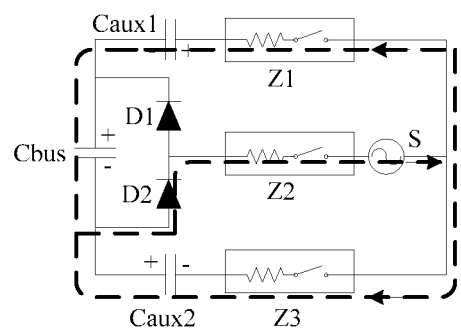
FIG. 4c is a schematic diagram of a charging path in a case that the alternating current power source in the circuit shown in FIG. 4a supplies a backward voltage.

In a case that the alternating current power source S supplies a forward voltage, two charging paths exist, as shown in FIG. 4b. In one of the charging paths, a current flows through Z2, D1, Cbus, Caux2 and Z3, thereby forming a charging loop to charge Cbus and Caux2. In the other charging path, a current flows through Z2, D1, Caux1 and Z1, thereby forming a charging loop to charge Caux1 backwardly. In a case that the alternating current power source S supplies a backward voltage, two charging paths exist, as shown in FIG. 4c. In one of the charging paths, a current flows through Z1, Caux1, Cbus, D2 and Z2, thereby forming a charging loop to charge Cbus and Caux1. In the other charging path, a current flows through Z3, Caux2, D2 and Z2, thereby forming a charging loop to charge Caux2 backwardly.

It is assumed that a voltage amplitude of the alternating current power source S is denoted as Vs, a steady-state voltage of Cbus is denoted as Vbus, a steady-state voltage of Caux1 is denoted as Vaux1 and a steady-state voltage of Caux2 is denoted as Vaux2. After the charging enters a steady state, currents flowing through the two charging path in FIG. 4b and currents flowing through the two charging paths in FIG. 4c each approach zero, that is, voltage drops of the switching current limiting devices Z1, Z2 and Z3 approach zero. If voltage drops of the diodes D1 and D2 in the loops are omitted, relations of voltages in the two charging loops in FIG. 4b are respectively expressed as $Vs=Vbus+Vaux2$, and $Vaux1=-Vs$.

Relations of voltages in the two charging loops in FIG. 4c are respectively expressed as $Vs=Vbus+Vaux1$, and $Vaux2=-Vs$.

Based on the above four expressions, the charged steady-state voltage of Cbus may be calculated as $Vbus=2Vs$.

Figure 5A:
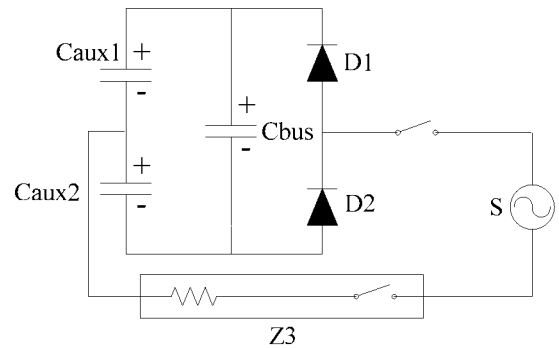
FIG. 5a is a schematic structural diagram of a pre-charge circuit according to an embodiment of the present disclosure.
Figure 5B:
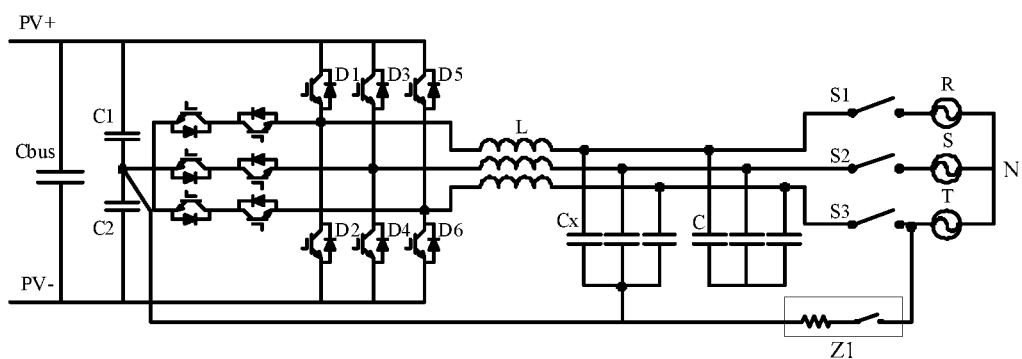
FIG. 5b is a schematic structural diagram of a three-phase three-level photovoltaic inverter in which the circuit shown in FIG. 5a is applied.

As shown in FIG. 5a, a pre-charge circuit may include one alternating current power source S, one half-bridge rectifier formed by diodes D1 and D2 connected in series, two auxiliary charging capacitors Caux1 and Caux2 and several current limiting devices and controllable switches, in which the equation Vbus=2Vs is also satisfied and is not derived herein. A pre-charge function may be achieved by applying the circuit shown in FIG. 5a in a three-phase three-level photovoltaic inverter shown in FIG. 5b, in which the auxiliary charging capacitor Caux may be embodied directly as an existing positive bus capacitor C1 and an existing negative bus capacitor C2 in the inverter, a switching current limiting device Z1 is connected in series between a neutral point N and a direct current side PV+ (or PV−) of an electrical grid, the alternating current power source is embodied directly as all or some of existing three phase voltages R, S and T, and the half-bridge rectifier is embodied directly as all or some of existing diodes D1 to D6 of an inverting circuit. In addition, Z1 may be omitted, since its function may be achieved by an alternating current reactor and a grid-connected switch of the photovoltaic inverter.

III. Example 3

Figure 6:
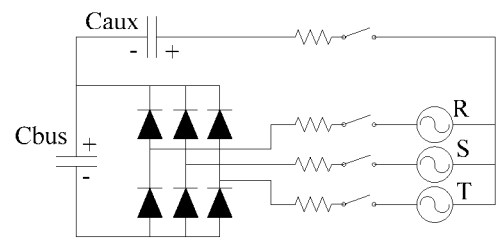
FIG. 6 is a schematic structural diagram of a pre-charge circuit according to an embodiment of the present disclosure.

A three-phase power source may be fully used for rectification to accelerate charging and improve a load capability of a direct current side of the inverter. As shown in FIG. 6, a pre-charge circuit includes three alternating current power sources, three half-bridge rectifiers, one auxiliary charging capacitor Caux and four switching current limiting devices. FIG. 6 differs from FIG. 2a only in the increased numbers of alternating current power sources and half-bridge rectifiers without changing the charging principle, which therefore can be understood by referring to descriptions related to FIGS. 2b and 2c.

Figure 7:
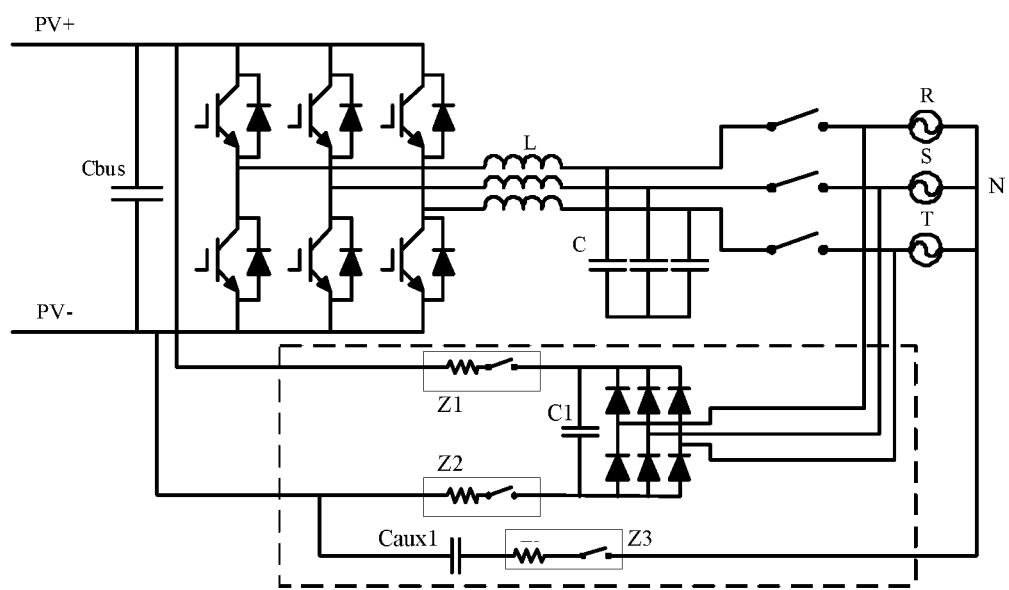
FIG. 7 is a schematic structural diagram of a three-phase two-level photovoltaic inverter in which the circuit shown in FIG. 6 is applied.

A pre-charge function may be achieved by applying the circuit shown in FIG. 6 in a three-phase two-level photovoltaic inverter shown in FIG. 7, in which an auxiliary charging capacitor Caux 1, three half-bridge rectifiers and three switching current limiting devices Z1 to Z3 are added additionally. It can be seen by comparing with FIG. 1 that, the circuit shown in FIG. 7 is formed by adding Caux1 and Z3 to the circuit shown in FIG. 1 (C1 is a normal capacitor for filtering and can be omitted). Certainly, a portion of components in the pre-charge circuit may be replaced with existing hardware of the photovoltaic inverter, to save hardware cost.

In addition, it is further provided a photovoltaic inverter including any one of the above pre-charge circuits according to an embodiment of the present disclosure. In a case that the photovoltaic inverter meets a pre-charge condition (for example, when it is determined that the photovoltaic inverter operates in a static var generator mode, or when it is determined that the photovoltaic inverter is to be turned on under a high voltage of a photovoltaic battery or when a pre-charge instruction is received), a respective controllable switch is switched on to pre-charge a target charging capacitor. After the pre-charge of the target charging capacitor is finished, the controllable switch is switched off to end the pre-charge. Therefore, the issue of the low pre-charge voltage of the direct current bus is addressed, thereby avoiding a current impact generated when the photovoltaic inverter is electrically connected to a photovoltaic battery or when a grid-connection is performed.

In summary, according to the present disclosure, with the voltage doubling rectifier circuit including the alternating current power source, the half-bridge rectifier, the auxiliary charging capacitor, the current limiting device, the controllable switch and the target charging capacitor, the target charging capacitor is pre-charged to raise a voltage across the target charging capacitor (i.e. a pre-charge voltage of a direct current bus) maximally to two times of a peak voltage of the alternating current power source. Therefore, the issue of the low pre-charge voltage of the direct current bus is addressed, thereby avoiding the current impact generated when the photovoltaic inverter is electrically connected to the photovoltaic battery or when a grid-connection is performed.

In the present specification, the embodiments are described in a progressive manner. Each embodiment focuses on an aspect differences from other embodiments, and reference can be made to these similar parts among the embodiments.

The above illustration of the disclosed embodiments enables those skilled in the art to implement or practice the present disclosure. Many changes to these embodiments are apparent to those skilled in the art, and general principles defined herein can be implemented in other embodiments without departing from the spirit or scope of the present disclosure. Hence, the present disclosure is not limited to the embodiments disclosed herein, but is to conform to the widest scope consistent with principles and novel features disclosed herein.

The invention claimed is:

1. A pre-charge circuit, comprising an alternating current power source, a half-bridge rectifier, an auxiliary charging capacitor, a current limiting device and a controllable switch, and the pre-charge circuit being connected to a target charging capacitor to form a voltage doubling rectifier circuit; wherein a direct current side of the half-bridge rectifier is connected in parallel to the target charging capacitor, and an alternating current side of the half-bridge rectifier is connected to one end of the alternating current power source;

one end of the auxiliary charging capacitor is connected to any one end of the target charging capacitor, and the other end of the auxiliary charging capacitor is connected to the other end of the alternating current power source; and the current limiting device and the controllable switch are connected in series in each charging path of the pre-charge circuit.

2. The pre-charge circuit according to claim 1, wherein the alternating current power source is a phase voltage of an electrical grid or a line voltage of an electrical grid.

3. The pre-charge circuit according to claim 1, wherein a semiconductor device in the half-bridge rectifier is a diode, a thyristor, a Metallic Oxide Semiconductor Field Effect Transistor (MOSFET) or an Insulated Gate Bipolar Transistor (IGBT) with anti-parallel diode.

4. The pre-charge circuit according to claim 1, wherein the current limiting device is a resistor, an electrical-inductor, a choke coil, or any combination thereof.

5. The pre-charge circuit according to claim 1, wherein the controllable switch is a relay, a Metallic Oxide Semiconductor Field Effect Transistor (MOSFET) or an Insulated Gate Bipolar Transistor (IGBT).

6. The pre-charge circuit according to claim 1, wherein a semiconductor device in the half-bridge rectifier is an anti-parallel diode in an inverting circuit of a photovoltaic inverter.

7. The pre-charge circuit according to claim 1, wherein the auxiliary charging capacitor is a positive bus capacitor and/or a negative bus capacitor on a direct current side of a photovoltaic inverter.

8. The pre-charge circuit according to claim 1, wherein the current limiting device is an alternating current reactor of a photovoltaic inverter.

9. The pre-charge circuit according to claim 1, wherein the controllable switch is a grid-connected switch of a photovoltaic inverter.

10. A photovoltaic inverter, comprising a pre-charge circuit, the pre-charge circuit comprising an alternating current power source, a half-bridge rectifier, an auxiliary charging capacitor, a current limiting device and a controllable switch, and the pre-charge circuit being connected to a target charging capacitor to form a voltage doubling rectifier circuit; wherein a direct current side of the half-bridge rectifier is connected in parallel to the target charging capacitor, and an alternating current side of the half-bridge rectifier is connected to one end of the alternating current power source;

one end of the auxiliary charging capacitor is connected to any one end of the target charging capacitor, and the other end of the auxiliary charging capacitor is connected to the other end of the alternating current power source; and the current limiting device and the controllable switch are connected in series in each charging path of the pre-charging circuit.

11. The photovoltaic inverter according to claim 10, wherein the alternating current power source is a phase voltage of an electrical grid or a line voltage of an electrical grid.

12. The photovoltaic inverter according to claim 10, wherein a semiconductor device in the half-bridge rectifier is a diode, a thyristor, a Metallic Oxide Semiconductor Field Effect Transistor (MOSFET) or an Insulated Gate Bipolar Transistor (IGBT) with anti-parallel diode.

13. The photovoltaic inverter according to claim 10, wherein the current limiting device is a resistor, an electrical-inductor, a choke coil, or any combination thereof.

14. The photovoltaic inverter according to claim 10, wherein the controllable switch is a relay, a Metallic Oxide Semiconductor Field Effect Transistor (MOSFET) or an Insulated Gate Bipolar Transistor (IGBT).

15. The photovoltaic inverter according to claim 10, wherein a semiconductor device in the half-bridge rectifier is an anti-parallel diode in an inverting circuit of a photovoltaic inverter.

16. The photovoltaic inverter according to claim 10, wherein the auxiliary charging capacitor is a positive bus capacitor and/or a negative bus capacitor on a direct current side of a photovoltaic inverter.

17. The photovoltaic inverter according to claim 10, wherein the current limiting device is an alternating current reactor of a photovoltaic inverter.

18. The photovoltaic inverter according to claim 10, wherein the controllable switch is a grid-connected switch of a photovoltaic inverter.

* * * * *